United States Patent
Matsuda et al.

(10) Patent No.: US 11,041,550 B2
(45) Date of Patent: Jun. 22, 2021

(54) TOROIDAL CONTINUOUSLY VARIABLE TRANSMISSION

(71) Applicant: KAWASAKI JUKOGYO KABUSHIKI KAISHA, Kobe (JP)

(72) Inventors: Kippei Matsuda, Kobe (JP); Hideyuki Imai, Akashi (JP); Kenichiro Tanaka, Kobe (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 340 days.

(21) Appl. No.: 16/091,783

(22) PCT Filed: Apr. 6, 2016

(86) PCT No.: PCT/JP2016/001929
§ 371 (c)(1),
(2) Date: Oct. 5, 2018

(87) PCT Pub. No.: WO2017/175255
PCT Pub. Date: Oct. 12, 2017

(65) Prior Publication Data
US 2019/0101193 A1    Apr. 4, 2019

(51) Int. Cl.
*F16H 15/38* (2006.01)

(52) U.S. Cl.
CPC .................... *F16H 15/38* (2013.01)

(58) Field of Classification Search
CPC .... F16H 15/38; F16H 2015/386; F16H 15/16; F16H 15/32; F16H 15/36
See application file for complete search history.

(56) References Cited

U.S. PATENT DOCUMENTS

| | | | |
|---|---|---|---|
| 5,655,989 A | 8/1997 | Yamamoto | |
| 2002/0002098 A1* | 1/2002 | Oshidari | F16H 15/38 476/73 |
| 2002/0002778 A1* | 1/2002 | Ikeda | F16H 15/38 33/520 |
| 2003/0040400 A1* | 2/2003 | Suzuki | F16H 15/38 476/72 |

(Continued)

FOREIGN PATENT DOCUMENTS

| | | | |
|---|---|---|---|
| JP | 7-310796 A | 11/1995 | |
| JP | 2000352449 A | * 12/2000 | F16H 15/38 |

(Continued)

*Primary Examiner* — David M Fenstermacher
(74) *Attorney, Agent, or Firm* — Sughrue Mion, PLLC

(57) ABSTRACT

A toroidal continuously variable transmission including input and output discs disposed to face each other so that a rotational axis of the input disc and a rotational axis of the output disc conform, each of the discs having a concave contact surface; a power roller sandwiched between the contact surfaces of discs so that the power roller is tiltable, the power roller transmitting a rotational driving force of the input disc to the output disc with a transmission ratio corresponding to a tilt motion angle; and a pressing device which presses one of the discs toward the other. When viewed from a direction of a tilt motion axis lof the power roller, the contact surface of at least one of discs has a region with a curvature that is larger than a curvature of a tilt motion trajectory of a contact surface of the power roller.

8 Claims, 3 Drawing Sheets

(56) References Cited

U.S. PATENT DOCUMENTS

| | | | | |
|---|---|---|---|---|
| 2004/0029675 A1* | 2/2004 | Shibukawa | ............. | F16H 15/38 476/40 |
| 2004/0082272 A1* | 4/2004 | Nakayama | ................ | B23B 5/40 451/11 |
| 2006/0194669 A1* | 8/2006 | Ruehle | .................... | F16H 15/38 476/73 |
| 2007/0281825 A1* | 12/2007 | Henzler | ................ | F16D 25/063 476/10 |
| 2008/0020892 A1* | 1/2008 | Souca | .................... | F16H 15/36 476/42 |
| 2008/0066386 A1* | 3/2008 | Kaneuchi | ................ | F16H 15/38 51/293 |
| 2012/0202644 A1* | 8/2012 | Durack | .................. | F16H 15/38 476/40 |
| 2013/0123062 A1* | 5/2013 | Okulov | .................. | F16H 15/40 476/50 |

FOREIGN PATENT DOCUMENTS

| | | | | |
|---|---|---|---|---|
| JP | 2003-074658 A | | 3/2003 | |
| JP | 2004084778 A | * | 3/2004 | ............. F16H 15/38 |

* cited by examiner

TOROIDAL CONTINUOUSLY VARIABLE TRANSMISSION

CROSS REFERENCE TO RELATED APPLICATIONS

This application is a National Stage of International Application No. PCT/JP2016/001929 filed Apr. 6, 2016.

TECHNICAL FIELD

The present invention relates to a toroidal continuously variable transmission (toroidal CVT) used in an aircraft or the like.

BACKGROUND ART

In a toroidal continuously variable transmission (toroidal CVT), power rollers are provided between an input disc and an output disc, and the input disc and the output disc are biased to become close to each other in a direction of a rotational axis line by a loading cam device, and sandwich the power rollers with a sufficient contact pressure. The contact surfaces of the input disc and the output disc have a circular-arc shape conforming to the tilt motion trajectory (track) of the contact surface of each of the power rollers in a case where the power rollers are tilted around tilt motion axis lines. By the tilt motions of the power rollers, a transmission ratio (transmission gear ratio) is continuously changed (see Patent Literature 1).

CITATION LIST

Patent Literature

Patent Literature 1: Japanese Laid-Open Patent Application Publication No. 2003-74658

SUMMARY OF INVENTION

Technical Problem

In a case where a bending moment of the input disc or the output disc is high in a state in which the transmission ratio is high, specifically, a state in which each of the power rollers is greatly tilted and is in contact with the radially outer (outward) portion of the input disc or the output disc, it is assumed that the radially outer portion of this disc may be slightly deflected by a reaction force applied by the power roller. In that case, a contact point between the power roller and this disc is slightly shifted to the radially outer side of this disc. This may result in errors between the transmission ratio and transmitted torque and their design values. In addition, it is necessary to increase the outer diameter or the like of the disc in view of shifting of the contact point between the power roller and the disc. This may lead to increased weight.

In view of the above, an object of the present invention is to provide a toroidal continuously variable transmission (toroidal CVT) which is capable of speed change with high accuracy and high efficiency while suppressing an increase in weight.

Solution to Problem

According to an aspect of the present invention, a toroidal continuously variable transmission comprises an input disc and an output disc disposed to face each other in a state in which a rotational axis line of the input disc and a rotational axis line of the output disc conform to each other, each of the input disc and the output disc having a concave contact surface; a power roller sandwiched between the contact surface of the input disc and the contact surface of the output disc so that the power roller is tiltable, the power roller being configured to transmit a rotational driving force of the input disc to the output disc with a transmission ratio corresponding to a tilt motion angle; and a pressing device which presses one of the input disc and the output disc toward the other of the input disc and the output disc, wherein when viewed from a direction of a tilt motion axis line of the power roller, the contact surface of at least one of the input disc and the output disc has a region with a curvature that is larger than a curvature of a tilt motion trajectory of a contact surface of the power roller.

In accordance with this configuration, the contact surface of the disc has a region with a curvature that is larger than that of the tilt motion trajectory (track) of the contact surface of the power roller. Therefore, in a case where the radially outer (outward) portion of the disc is slightly deflected in a direction that is away from the power roller, by a reaction force from the power roller due to a pressing force applied by the pressing device, the curvature of the contact surface of the disc becomes close to that of the tilt motion trajectory of the contact surface of the power roller. This makes it possible to prevent a situation in which a contact point between the power roller and the disc is shifted to the radially outer (outward) side of the disc. In this way, errors between a transmission ratio and transmitted torque and their design values can be reduced. In addition, it becomes possible to reduce a need for increasing the outer diameter or the like of the disc in view of shifting of the contact point between the power roller and the disc. As a result, it becomes possible to provide the toroidal continuously variable transmission (toroidal CVT) which is capable of speed change with high accuracy and high efficiency while suppressing an increase in weight.

When viewed from the direction of the tilt motion axis line, the contact surface of the at least one of the input disc and the output disc may have a shape in which the contact surface forms a part of a perfect circle.

In accordance with this configuration, the contact surface of the disc can be easily processed with high accuracy to form a shape in which the curvature of the contact surface of the disc is larger than that of the tilt motion trajectory of the contact surface of the power roller.

When viewed from the direction of the tilt motion axis line, a curvature center of the contact surface of the at least one of the input disc and the output disc may be closer to the rotational axis line than a tilt motion center of the power roller.

In accordance with this configuration, a position difference (position gap) between the tilt motion trajectory of the contact surface of the power roller and the contact surface of the disc gradually increases toward the radially outer (outward) side of the disc and decreases toward the radially inner (inward) side of the disc. Therefore, regarding the radially outer portion of the disc, which is easily deflected, errors between the transmission ratio and transmitted torque and their design values can be reduced. In addition, regarding the radially inner portion of the disc, which is not easily deflected, conventional design can be kept.

Advantageous Effects of Invention

In accordance with the present invention, it is possible to provide a toroidal continuously variable transmission (toroidal CVT) which is capable of speed change with high accuracy and high efficiency while suppressing an increase in weight.

DESCRIPTION OF EMBODIMENTS

Hereinafter, the embodiment of the present invention will be described with reference to the drawings.

Figure 1:
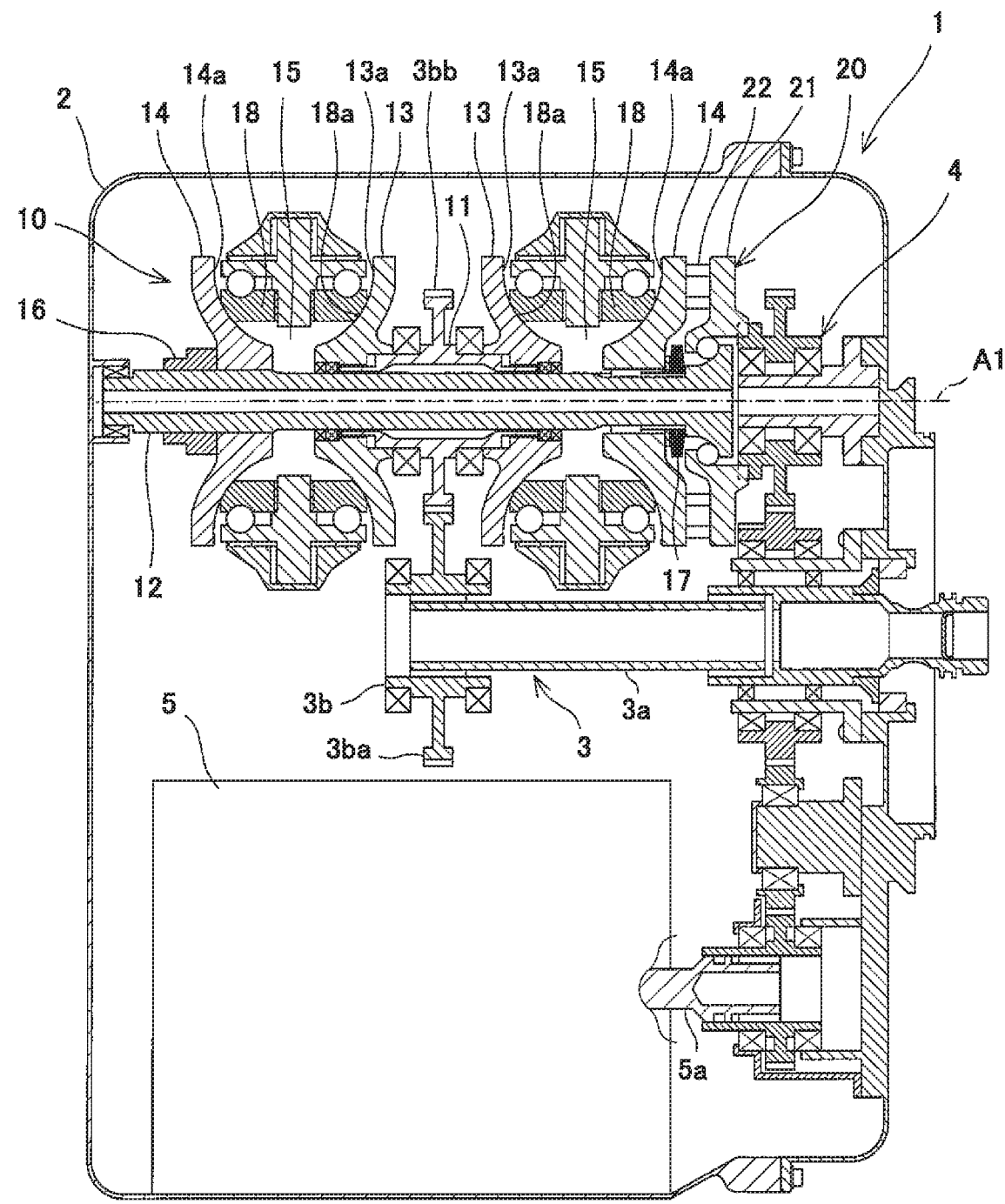
FIG. 1 is a cross-sectional view showing an integrated drive generator (IDG) including a toroidal continuously variable transmission (toroidal CVT) according to an embodiment.

FIG. 1 is a cross-sectional view showing an integrated drive generator 1 including a toroidal continuously variable transmission (toroidal CVT) 10 according to the embodiment. As shown in FIG. 1, the integrated drive generator 1 (hereinafter will be referred to as "IDG") is used in an AC power supply of an aircraft, and includes a casing 2 mounted on an engine of the aircraft. In the casing 2, an input mechanism 3, the toroidal CVT 10 (hereinafter will be referred to as "transmission"), a driving force transmission mechanism 4, and an electric power generator 5 are accommodated.

The transmission 10 includes a transmission input shaft 11 and a transmission output shaft 12 which are placed coaxially and are relatively rotatable (hereinafter, the axis lines of the shafts 11 and 12 will be referred to as "rotational axis line A1"). The transmission input shaft 11 is connected to an engine rotary shaft (not shown) via the input mechanism 3. The input mechanism 3 includes a device input shaft 3a to which a rotational driving force taken out of the engine rotary shaft is input, and a pair of gears 3b which transmit the rotation of the device input shaft 3a to the transmission input shaft 11. The pair of gears 3b include a gear 3ba which is rotatable together with the device input shaft 3a, and a gear 3bb which is rotatable together with the transmission input shaft 11. The transmission output shaft 12 is connected to an electric power generator input shaft 5a of an electric power generator 5 via a driving force transmission mechanism 4 (e.g., gear train).

The rotational driving force taken out of the engine rotary shaft is input to the transmission input shaft 11 via the input mechanism 3. The transmission 10 changes the speed of the rotation of the transmission input shaft 11 and outputs the rotation to the transmission output shaft 12. The rotational driving force is transmitted from the transmission output shaft 12 to the electric power generator input shaft 5a via the driving force transmission mechanism 4. When the electric power generator input shaft 5a is driven to rotate, the electric power generator 5 generates AC power. A transmission ratio (transmission gear ratio) of the transmission 10 is continuously changed so that the rotation speed of the electric power generator input shaft 5a is kept at a proper value (value corresponding to a frequency which is suitable for the operations of electric components in the aircraft), irrespective of a change of the rotation speed of the engine rotary shaft.

The transmission 10 is a half toroidal and double cavity CVT. The transmission 10 includes two sets of input disc 13 and output disc 14. The input discs 13 are fitted to transmission input shaft 11 so that the input discs 13 are rotatable together with the transmission input shaft 11. The output discs 14 are fitted to the transmission output shaft 12 so that the output discs 14 are rotatable together with the transmission output shaft 12. The two sets of discs 13, 14 are disposed at locations that are adjacent to each other in the direction of the rotational axis line A1. The discs 13, 14 are rotatable around the rotational axis line A1. The input disc 13 and the output disc 14 are disposed to face each other in the direction of the rotational axis line A1 of the transmission 10. The input disc 13 and the output disc 14 have concave contact surfaces 13a, 14a, respectively, facing each other. The input disc 13 and the output disc 14 form an annular cavity 15 around the rotational axis line A1 by the contact surfaces 13a, 14a.

The transmission 10 has a center input configuration. The transmission output shaft 12 is inserted into the transmission input shaft 11 and protrudes from the both sides of the transmission input shaft 11. The two input discs 13 are disposed back-to-back on the transmission input shaft 11. The two output discs 14 are disposed outward of the two input discs 13 in the direction of the rotational axis line A1. The gear 3bb which is rotatable together with the transmission input shaft 11 is provided on the outer peripheral surface of the transmission input shaft 11. The gear 3bb is disposed between the two input discs 13.

The output disc 14 on a first side (one side) is fastened to the transmission output shaft 12 by a fastening member 16. The output disc 14 on a second side (the other side) is biased toward the input disc 13 by a pre-loading spring 17. During the rotation, the output disc 14 on the second side is biased toward the input disc 13 by a pressing device 20. Specifically, the pressing device 20 presses (pushes) the output disc 14 in the direction of the rotational axis line A1. In this way, a force is generated to make the output disc 14 on the first side and the output disc 14 on the second side close to each other. The transmission 10 includes a plurality of power rollers 18 disposed within the cavity 15 and a plurality of trunnions 19 (see FIG. 2) which support the plurality of power rollers 18, respectively so that the plurality of power rollers 18 are tiltable (the power rollers 18 of FIG. 1 are at a neutral position). Contact surfaces 18a of the power rollers 18 have a circular-arc shape conforming to the shape of the contact surfaces 13a, 14a of the input disc 13 and the output disc 14.

The pressing device 20 is a loading cam device. The output disc 14 is connected to the driving force transmission mechanism 4 via the pressing device 20. The pressing device 20 includes a cam plate 21 which is disposed coaxially with the output disc 14 and is rotatable, and a plurality of rollers 22 sandwiched between the output disc 14 and the cam plate 21. Cam surfaces 14b, 21a facing each other, of the output disc 14 and the cam plate 21 have smooth concave and convex portions which are arranged in a circumferential direction. The rollers 22 are sandwiched between the cam surfaces 14b, 21a in the direction of the rotational axis line A1 and in the circumferential direction. When the rotation torque of the output disc 14 and the cam plate 21 is increased, the output disc 14 is pressed in a direction that is away from the cam surface 21 by a cam action.

Figure 2:
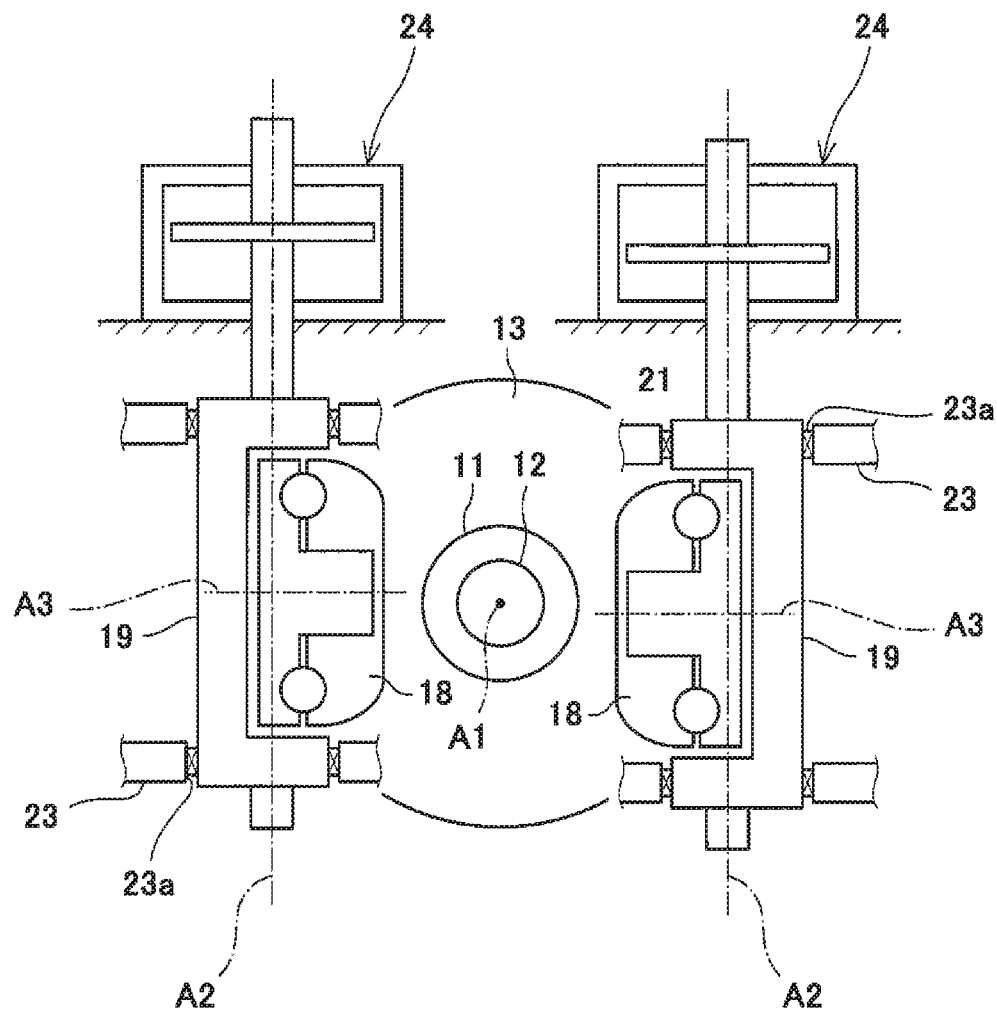
FIG. 2 is a cross-sectional view showing the toroidal CVT of FIG. 1, when viewed from a direction of a rotational axis line.

FIG. 2 is a cross-sectional view showing the transmission 10 of FIG. 1, when viewed from the direction of the rotational axis line A1. As shown in FIG. 2, the trunnions 19 are supported by the casing 2 so that each of the trunnions 19 is tiltable around a tilt motion axis line A2 and displaceable in the direction of the tilt motion axis line A2. The tilt motion axis line A2 is skew with respect to the rotational axis line A1. The power rollers 18 are supported by the trunnions 19, respectively so that each of the power rollers 18 is rotatable around a rotational axis line A3 perpendicular to the tilt motion axis line A2.

Each of the trunnions 19 is fitted into through-holes 23a of yokes 23 secured to the casing 2 so that the trunnion 19 is rotatable. The trunnions 19 are supported by the casing 2 via the yokes 23 so that each of the trunnions 19 is tiltable around the tilt motion axis line A2 and displaceable in the direction of the tilt motion axis line A2. The trunnions 19 are connected to hydraulic driving mechanisms 24, respectively. Each of the hydraulic driving mechanisms 24 is configured to reciprocatingly displace the trunnion 19 together with the power roller 18 in the direction of the tilt motion axis line A2.

As shown in FIGS. 1 and 2, when the input discs 13 are driven to rotate by the transmission input shaft 11, the output discs 14 are driven to rotate via the power rollers 18, and the transmission output shaft 12 is driven to rotate. When the trunnions 19 and the power rollers 18 mounted on the trunnions 19 are displaced in the direction of the tilt motion axis line A2, angles (hereinafter will be referred to as "tilt motion angles") of the power rollers 18 around the tilt motion axis lines A2 are changed, and the transmission ratio (transmission gear ratio) of the transmission 10 is continuously changed based on the tilt motion angles. The power rollers 18 are sandwiched between the contact surface 13a of the input disc 13 and the contact surface 14a of the output disc 14 in a state in which each of the power rollers 18 is tiltable around the tilt motion axis line A2. The power rollers 18 change the speed of the rotational driving force of the input disc 13 with the transmission ratio corresponding to the tilt motion angles, and transmit the rotational driving force to the output disc 14. When the rotation torque of the output disc 13 is increased, the pressing device 20 presses (pushes) the output disc 14 so that the output disc 14 approaches the input disc 13. Thus, a pressing force with which the power rollers 18 are sandwiched between the input disc 13 and the output disc 14 is increased.

Figure 3:
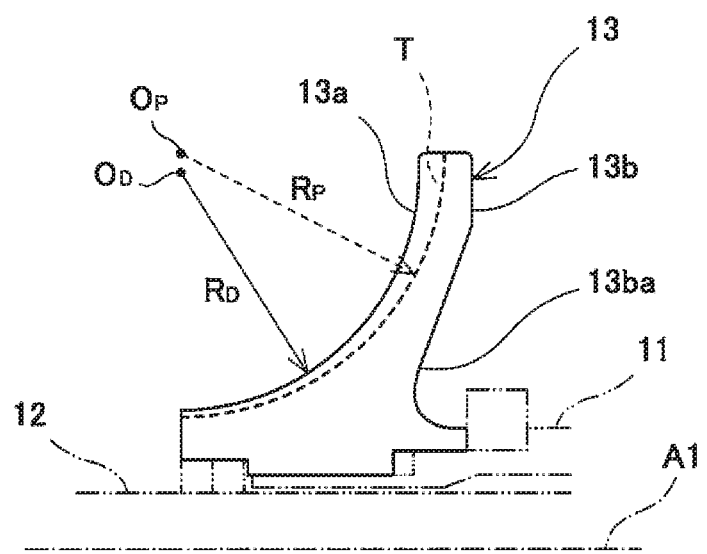
FIG. 3 is a schematic view showing a tilt motion trajectory (track) of a contact surface of a power roller and an input disc, when viewed from a direction of a tilt motion axis line.
Figure 4:
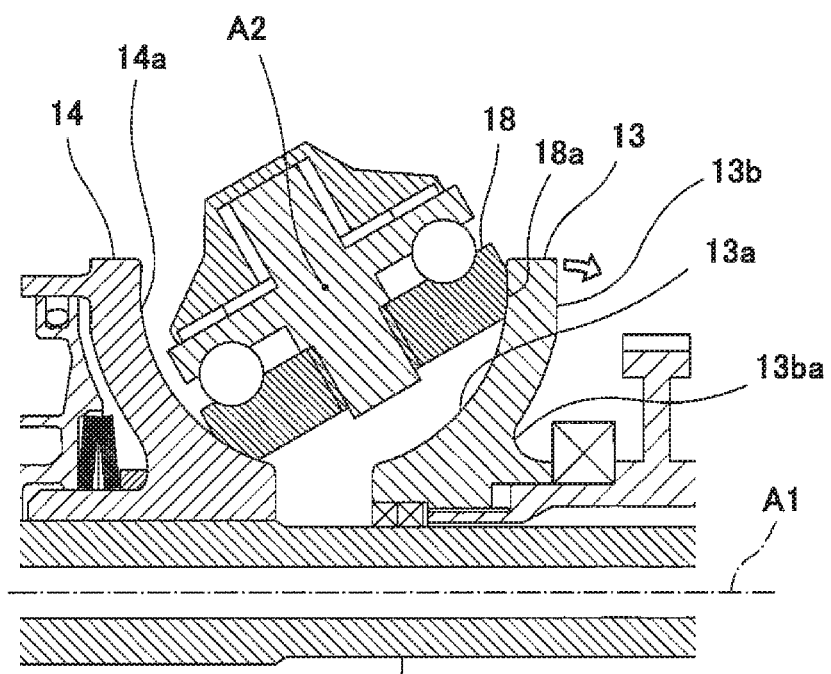
FIG. 4 is an enlarged view showing the input disc and a region that is in the vicinity of the input disc when viewed from the direction of the tilt motion axis line, in a case where the power roller is tilted from a neutral position.

FIG. 3 is a schematic view showing a tilt motion trajectory (track) T of the contact surface 18a of the power roller 18 and the input disc 13, when viewed from the direction of the tilt motion axis line A2. FIG. 4 is an enlarged view showing the input disc 13 and a region that is in the vicinity of the input disc 13 when viewed from the direction of the tilt motion axis line A2, in a case where the power roller 18 is tilted from a neutral position (constant velocity (speed) position). In FIG. 3, the tilt motion trajectory (track) T of the contact surface 18a of the power roller 18 in a case where the power roller 18 is tilted around the tilt motion axis line A2 is indicated by a broken line. The tilt motion trajectory T is the trajectory of a position where the power roller 18 and the input disc 13 contact each other, i.e., the trajectory of the outermost periphery of the power roller 18. In FIG. 3, the input disc 13 is shown in a state in which no load is applied to the input disc 13. Hereinafter, attention will be focused on the input disc 13. However, the same applies to the output disc 14.

As shown in FIGS. 3 and 4, the input disc 13 has the concave contact surface 13a facing the power roller 18, and a back surface 13b which is on a side opposite to the contact surface 13a. The back surface 13b has a depressed (recessed) part 13ba which is depressed toward the contact surface 13a. The depressed part 13ba has an annular shape around the rotational axis line A1. The depressed part 13ba is formed in at least a radially inner (inward) region of the back surface 13b. In the present embodiment, the depressed part 13ba occupies 20% to 80% of the back surface 13b. By forming the depressed part 13ba, the thickness of the input disc 13 is not increased toward the radially inner side. Therefore, the weight of the input disc 13 can be reduced. Alternatively, the depressed part may not be provided in the back surface of the disc.

When viewed from the direction of the tilt motion axis line A2, the entire concave contact surface 13a of the input disc 13 has a shape in which the contact surface 13a forms a part of a perfect circle. The entire contact surface 13a of the input disc 13 has a curvature larger than that of the tilt motion trajectory T of the contact surface 18a of the power roller 18. In other words, a curvature radius $R_D$ of the concave contact surface 13a of the input disc 13 is smaller than a curvature radius $R_P$ of the tilt motion trajectory T of the contact surface 18a of the power roller 18.

A curvature center $O_D$ of the contact surface 13a of the input disc 13 is closer to the rotational axis line A1 than a tilt motion center $O_P$ of the power roller 18. A position in the direction of the rotational axis line A1, of the curvature center $O_D$, conforms to a position in the direction of the rotational axis line A1, of the tilt motion center $O_P$. A distance between the contact surface 13a of the input disc 13 and the tilt motion trajectory T of the contact surface 18a of the power roller 18 gradually increases from a location that is closer to the rotational axis line A1 to a location that is more distant from the rotational axis line A1.

In a case where the transmission ratio (transmission gear ratio) of the transmission 10 is increased, each of the hydraulic driving mechanisms 24 (see FIG. 2) displaces the power roller 18 in the direction of the tilt motion axis line A2 via the trunnion 19. Thus, the power roller 18 is tilted from the neutral position (constant velocity (speed) position). As shown in FIG. 4, for example, the power roller 18 contacts the radially inner (inward) region of the contact surface 14a of the output disc 14 and the radially outer (outward) region of the contact surface 13a of the input disc 13.

At this time, the pressing device 20 (see FIG. 1) biases the input disc 13 and the output disc 14 so that the input disc 13 and the output disc 14 become close to each other in the direction of the rotational axis line A1. Therefore, a strong reaction force is applied by the power roller 18 to the input disc 13 and the output disc 14. Since the input disc 13 has the depressed (recessed) part 13ba, the radially outer (outward) portion of the input disc 13 is deflected in a direction that is away from the power roller 18 (see white arrow in FIG. 4).

However, the curvature of the contact surface 13a of the input disc 13 is set to be larger than that of the tilt motion trajectory T of the contact surface 18a of the power roller 18. Due to the deflection, the curvature of the contact surface 13a of the input disc 13 becomes close to the curvature of the tilt motion trajectory T of the contact surface 18a of the power roller 18. This makes it possible to prevent a situation in which the contact point between the input disc 13 and the power roller 18 is shifted to the radially outer (outward) side of the input disc 13. In this way, errors between the transmission ratio and the transmitted torque and their design values can be reduced. In addition, it becomes possible to reduce a need for increasing the outer diameter or the like of the input disc 13 in view of shifting of the contact point between the input disc 13 and the power roller 18. As a result, it becomes possible to provide the toroidal CVT 10 which is capable of speed change with high accuracy and high efficiency while suppressing an increase in weight.

When viewed from the direction of the tilt motion axis line A2, the contact surface 13a of the input disc 13 has a shape in which the contact surface 13a forms a part of a perfect circle. Therefore, the contact surface 13a of the input disc 13 can be easily processed with high accuracy to form a shape in which the curvature of the contact surface 13a of the input disc 13 is larger than that of the tilt motion trajectory T of the contact surface 18a of the power roller 18.

When viewed from the direction of the tilt motion axis line A2, the curvature center $O_D$ of the contact surface 13a of the input disc 13 is closer to the rotational axis line A1 than the tilt motion center $O_P$ of the power roller 18. Therefore, a position difference (position gap) between the tilt motion trajectory T of the contact surface 18a of the power roller 18 and the contact surface 13a of the input disc 13 gradually increases toward the radially outer (outward) side of the input disc 13 and decreases toward the radially inner (inward) side of the input disc 13. Therefore, regarding the radially outer (outward) portion of the input disc 13, which is easily deflected, errors between the transmission ratio and the transmitted torque and their design values can be reduced. In addition, regarding the radially inner (inward) portion of the input disc 13, which is not easily deflected, conventional design can be kept.

The present invention is not limited to the above-described embodiment. The configuration may be changed, added or deleted. For example, the pressing device is not limited to the pressing device of the loading cam type, and may be a hydraulic pressing device. Instead of setting the curvatures of the contact surfaces of both of the input disc and the output disc so that they are larger than the curvature of the tilt motion trajectory of the contact surface of the power roller, the curvature of the contact surface of only one of the input disc and the output disc may be set to be larger than that of the tilt motion trajectory of the contact surface of the power roller. The contact surface of the disc may include a portion with a curvature that is larger than that of the tilt motion trajectory of the contact surface of the power roller. The contact surface of the disc may have a shape in which a plurality of different curvatures are arranged from the radially inner (inward) side to the radially outer (outward) side. In a case where the curvatures of the contact surfaces of the plurality of discs are set to be larger than that of the tilt motion trajectory of the contact surface of the power roller, these curvatures may be different from each other between the discs. The curvature center $O_D$ of the contact surface 13a of the input disc 13 is closer to the rotational axis line A1 than the tilt motion center $O_P$ of the power roller 18, and may be different from the tilt motion center $O_P$ in the direction of the rotational axis line A1. Although the double cavity transmission 10 has the center input/outer output configuration, the transmission 10 is not limited to this and may be a transmission having an outer input/center output configuration. The toroidal CVT is not limited to the double cavity CVT and may be a single cavity CVT. The toroidal CVT may be used in automobile or the like, as well as the aircraft. The driving mechanism for displacing the trunnion 19 is not limited to the hydraulic driving mechanism and may be an electric driving mechanism.

REFERENCE SIGNS LIST

10 toroidal continuously variable transmission (toroidal CVT)
13 input disc
13a contact surface
14 output disc
14a contact surface
18 power roller
18a contact surface
20 pressing device
A1 rotational axis line
A2 tilt motion axis line
T tilt motion trajectory

The invention claimed is:

1. A toroidal continuously variable transmission comprising:
    an input disc and an output disc disposed to face each other in a state in which a rotational axis line of the input disc and a rotational axis line of the output disc conform to each other, each of the input disc and the output disc having a concave contact surface;
    a power roller sandwiched between the contact surface of the input disc and the contact surface of the output disc so that the power roller is tiltable, the power roller being configured to transmit a rotational driving force of the input disc to the output disc with a transmission ratio corresponding to a tilt motion angle; and
    a pressing device which presses one of the input disc and the output disc toward the other of the input disc and the output disc,
    wherein when viewed from a direction of a tilt motion axis line of the power roller, the contact surface of at least one of the input disc and the output disc has a region with a curvature that is larger than a curvature of a tilt motion trajectory of a contact surface of the power roller.

2. The toroidal continuously variable transmission according to claim 1,
    wherein when viewed from the direction of the tilt motion axis line, the contact surface of the at least one of the input disc and the output disc has a shape in which the contact surface forms a part of a perfect circle.

3. The toroidal continuously variable transmission according to claim 1,
    wherein when viewed from the direction of the tilt motion axis line, a curvature center of the contact surface of the at least one of the input disc and the output disc is closer to the rotational axis line than a tilt motion center of the power roller.

4. The toroidal continuously variable transmission according to claim 2,
    wherein when viewed from the direction of the tilt motion axis line, a curvature center of the contact surface of the at least one of the input disc and the output disc is closer to the rotational axis line than a tilt motion center of the power roller.

5. The toroidal continuously variable transmission according to claim 1, wherein the region is a radially outer portion of the contact surface of the at least one of the input disc and the output disc.

6. The toroidal continuously variable transmission according to claim 2, wherein the region is a radially outer portion of the contact surface of the at least one of the input disc and the output disc.

7. The toroidal continuously variable transmission according to claim 3, wherein the region is a radially outer portion of the contact surface of the at least one of the input disc and the output disc.

8. The toroidal continuously variable transmission according to claim 4, wherein the region is a radially outer portion of the contact surface of the at least one of the input disc and the output disc.

* * * * *